(12) United States Patent
Taylor et al.

(10) Patent No.: US 8,045,696 B1
(45) Date of Patent: Oct. 25, 2011

(54) METHOD AND APPARATUS FOR DETERMINING CUSTOMER ROUTING IN A CALL CENTER

(75) Inventors: Robin Donald Taylor, Danville, CA (US); Robert Wayne Snyder, Danville, CA (US)

(73) Assignee: Avaya Inc., Basking Ridge, NJ (US)

( * ) Notice: Subject to any disclaimer, the term of this patent is extended or adjusted under 35 U.S.C. 154(b) by 1407 days.

(21) Appl. No.: 11/582,808

(22) Filed: Oct. 18, 2006

(51) Int. Cl.
*H04M 3/00* (2006.01)
*H04M 5/00* (2006.01)

(52) U.S. Cl. ......... 379/265.11; 379/265.01; 379/265.02; 379/265.05; 379/266.1

(58) Field of Classification Search ............. 379/265.11, 379/266.01, 265.02, 266.03, 88.18, 32.01, 379/265.01, 265.05, 266.1
See application file for complete search history.

(56) References Cited

U.S. PATENT DOCUMENTS

| 7,076,032 | B1 * | 7/2006 | Pirasteh et al. | 379/88.18 |
|---|---|---|---|---|
| 7,436,948 | B1 * | 10/2008 | Thenthiruperai | 379/266.03 |
| 2005/0036594 | A1 * | 2/2005 | Hunter et al. | 379/88.18 |
| 2005/0163304 | A1 * | 7/2005 | Judkins et al. | 379/265.02 |
| 2005/0201526 | A1 * | 9/2005 | Bittner | 379/32.01 |
| 2006/0256956 | A1 * | 11/2006 | Lee et al. | 379/266.01 |
| 2007/0263838 | A1 * | 11/2007 | Wiseman et al. | 379/265.02 |

* cited by examiner

*Primary Examiner* — Thjuan K Addy
(74) *Attorney, Agent, or Firm* — Chapin IP Law, LLC; David W. Rouille, Esq.

(57) ABSTRACT

A method, apparatus and computer program product for determining customer routing in a call center is presented. Information relating to a customer in a communication session with the call center is recorded. The information relating to the customer in a communication session with the call center is evaluated and a determination made whether to transfer the customer to a generalist. The customer is transferred to a generalist when a result of the determining is that the customer should be transferred to a generalist and the customer is not transferred to a generalist and when the result of the determining is that the customer should not be transferred to a generalist.

21 Claims, 4 Drawing Sheets

METHOD AND APPARATUS FOR DETERMINING CUSTOMER ROUTING IN A CALL CENTER

BACKGROUND

Call centers are systems in which a person can communicate to receive information. Such communication can include, but is not limited to, telephone calls, Internet access, email, and FAX. A call center can include one or more interactive voice response (IVR) systems. The one or more IVRs provide automatic branching voice queries to which the caller responds with button pushes on a telephone keypad or with voice responses on a telephone. The call center may be provided having only the one or more IVR systems, or alternatively, it is also provided having human agents. For example, at the end of the IVR branching voice queries, the caller can be directed to press zero to speak to an agent. The call center can also include one or more database server computers, one or more database storage areas, one or more web server computers, and one or more email server computers.

SUMMARY

Conventional mechanisms such as those explained above suffer from a variety of deficiencies. One such deficiency is that in conventional call centers, if the customer is not able to navigate well through the self-service options of the IVR, the end result may be a route to an agent who is not appropriate to handle the customer contact. The scenario might be that the customer has tried several options to navigate a self-service menu and finally, out of confusion or impatience, selects an option that delivers to a live agent. If the agent is not able to handle the contact, a transfer is likely to another agent. Transfers are costly to the business because they require more than one live agent to become involved and they may tarnish the brand by making the customer feel that they can't reach the person they need on the first try.

Embodiments of the invention significantly overcome such deficiencies and provide mechanisms and techniques that record information about the customer's experience with self-service and use the information to avoid unnecessary transfers. The information is used by the routing engine to route contacts to agents. The information to be collected is of two kinds: the number of options the customer chose and how much time he/she spent in self-service, and how many times the contact was transferred during the life of the contact. Where it can be inferred that a particular customer has a past history of unsuccessful experiences in self-service and/or transferring multiple times after self-service, this customer should be routed to a generalist. The generalist may be alerted that this customer may need a little assistance in verbalizing his/her reason for making contact.

The present invention adds additional logic to the contact routing to determine if the self-service history this customer has had with the business warrants routing to a generalist to avoid a negative perception from the customer and save the business the expense of multiple transfers. The self-service history is collected from the customer's previous contacts with the business. The routing methodology utilizes additional information to interpret the customer's behavior in self-service. The methodology could determine that a preferred option would be to route the customer to a generalist rather than the agent that would be chosen based on the customer's choices. By analyzing a customer's previous behavior in self-service and using the information when routing a current contact to the best available agent, the overall customer perception of the business and the cost efficiency of routing to agents is improved.

In a particular embodiment of a method for determining customer routing in a call center, the method includes recording information relating to a customer in a communication session with the call center. The method further includes evaluating the information relating to the customer in a communication session with the call center and determining whether to transfer the customer to a generalist based on the evaluating the information relating to a customer in a communication session with the call center. Additionally, the method includes transferring the customer to a generalist when a result of the determining is that the customer should be transferred to a generalist and refraining from transferring the customer to a generalist and when the result of the determining is that the customer should not be transferred to a generalist.

Other embodiments include a computer readable medium having computer readable code thereon for determining customer routing in a call center. The computer readable medium includes instructions for recording information relating to a customer in a communication session with the call center. The computer readable medium further includes instructions for evaluating the information relating to a customer in a communication session with the call center and instructions for determining whether to transfer the customer to a generalist based on the evaluating the information relating to a customer in a communication session with the call center. The computer readable medium further includes instructions for transferring the customer to a generalist when a result of the determining is that the customer should be transferred to a generalist and refraining from transferring the customer to a generalist and when the result of the determining is that the customer should not be transferred to a generalist.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides a method of determining customer routing in a call center as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing a method of determining customer routing in a call center as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Avaya Inc. of Lincroft N.J.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
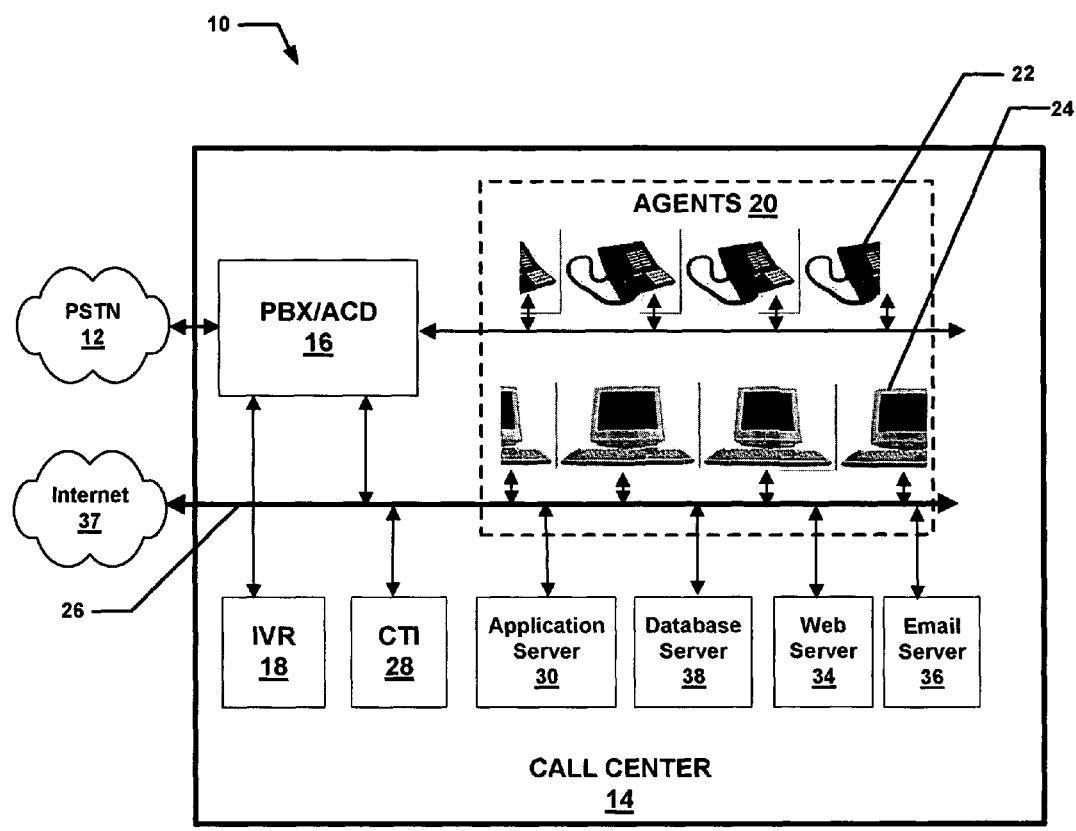
FIG. 1 illustrates a block diagram of a call center that performs a method of determining customer routing in a call center in accordance with embodiments of the invention.

Referring now to FIG. 1, a call center environment 10 is shown. The call center 14 is connected to the public switched telephone network 12 (PSTN). The PSTN is a worldwide telephone system that provides telephone call connections, including telephone connections to the call center 14. The call center 14 can include a private branch exchange 16 (PBX) usually combined with an automatic call distributor 16 (ACD). The PBX 16 is a sub-system that can route incoming telephone calls to intended call recipients, or agents. The ACD is a sub-system that can provide call queuing and automatic wait handling of incoming telephone calls. The PBX/ACD 16 can be coupled to one or more interactive voice response (IVR) systems 18. The IVR 18 comprises a system that provides voice queries to a telephone caller. Voice queries typically direct the telephone caller through a series of selections that can be chosen by the telephone caller via button pushes on the telephone keypad.

Within the IVR queries, the telephone caller can be directed by the IVR 18 to select an option that connects the telephone caller, via the PBX/ACD 16, to one of a group of agents 20. The agents 20 can have access to agent telephones, of which agent telephone 22 is representative of all agent telephones. The agents 20 can also have access to agent computers, of which agent computer 24 is representative of all agent computers.

The PBX/ACD 16 is further coupled to a network 26 that can be provided to couple together the PBX/ACD 16, the agent computers, for example agent computer 24, a computer telephony integration (CTI) server 28, an application server 30, a database server 32, a web server 34, and an email server 36. The network 26 can correspond, for example, to an Ethernet local area network.

The IVR 18 can, among the IVR selections offered, request that the telephone caller enter "identifying information," for example an account number, by button pushes on the telephone keypad or by voice responses from the telephone caller. Identifying information can also be automatically provided by the PBX/ACD 16 without entry by the telephone caller with a variety of methods, including dialed number identification service (DNIS) and automatic number identification (ANI). The identifying information is passed through the PBX/ACD 16 to the network 26. The CTI 28 receives the identifying information and coordinates the identifying information with "caller data," for example account history associated with the telephone caller, contained in the database server 38. An application program in the application server 30 can automatically provide a display of the caller data in a "screen pop" to the agent disposed upon the agent computer 24. Alternatively, the application program can reside within the agent computer 24.

The call center 14 can also be accessed via the Internet 37, for example by a web user who accesses a web page associated with the call center. The web user, via the Internet 37, connects to the web server 34 for web page access. The web user can also be an email user, in which case the email user connects to the email server 36 via the Internet 37. While web page access and email access have been described herein, the invention is not limited to only these specific Internet applications. A variety of Internet applications can access a variety of servers within the call center 14.

Attracting and retaining customers in a cost effective way is a high priority for businesses that use call centers as a means of communicating with their customers. Many companies use some form of self-service because it is a cheaper alternative to live agents. However, if the customer is not able to navigate well through the self-service options, the end result may be a route to an agent who is not appropriate to handle the customer contact. The scenario might be that the customer has tried several options to navigate a self-service menu and finally, out of confusion or impatience, selects an option that delivers the customer to a live agent. If the agent is not able to handle the contact, a transfer is likely to another agent. Transfers are costly to the business because they require more than one live agent to become involved and they may tarnish the brand by making the customer feel that they can't reach the person they need on the first try. By way of particular embodiments of the presently disclosed method and apparatus for determining customer routing in a call center, information about the customer's experience with self-service is recorded and is used to avoid unnecessary transfers. The information is used by the routing engine to route contacts to agents. The information to be collected is of two kinds: the number of options the customer chose and how much time he/she spent in self-service, and how many times the contact was transferred during the life of the contact. Where it can be inferred that a particular customer has a past history of unsuccessful experiences in self-service and/or transferring multiple times after self-service, this customer is routed to a generalist. The generalist is alerted that this customer may need a little assistance in verbalizing his/her reason for making contact. When the particular customer history does not indicate the customer has had a past history of unsuccessful experiences in self-service and/or transferring multiple times after self-service, then the customer is handled in a conventional manner.

Figure 2A:
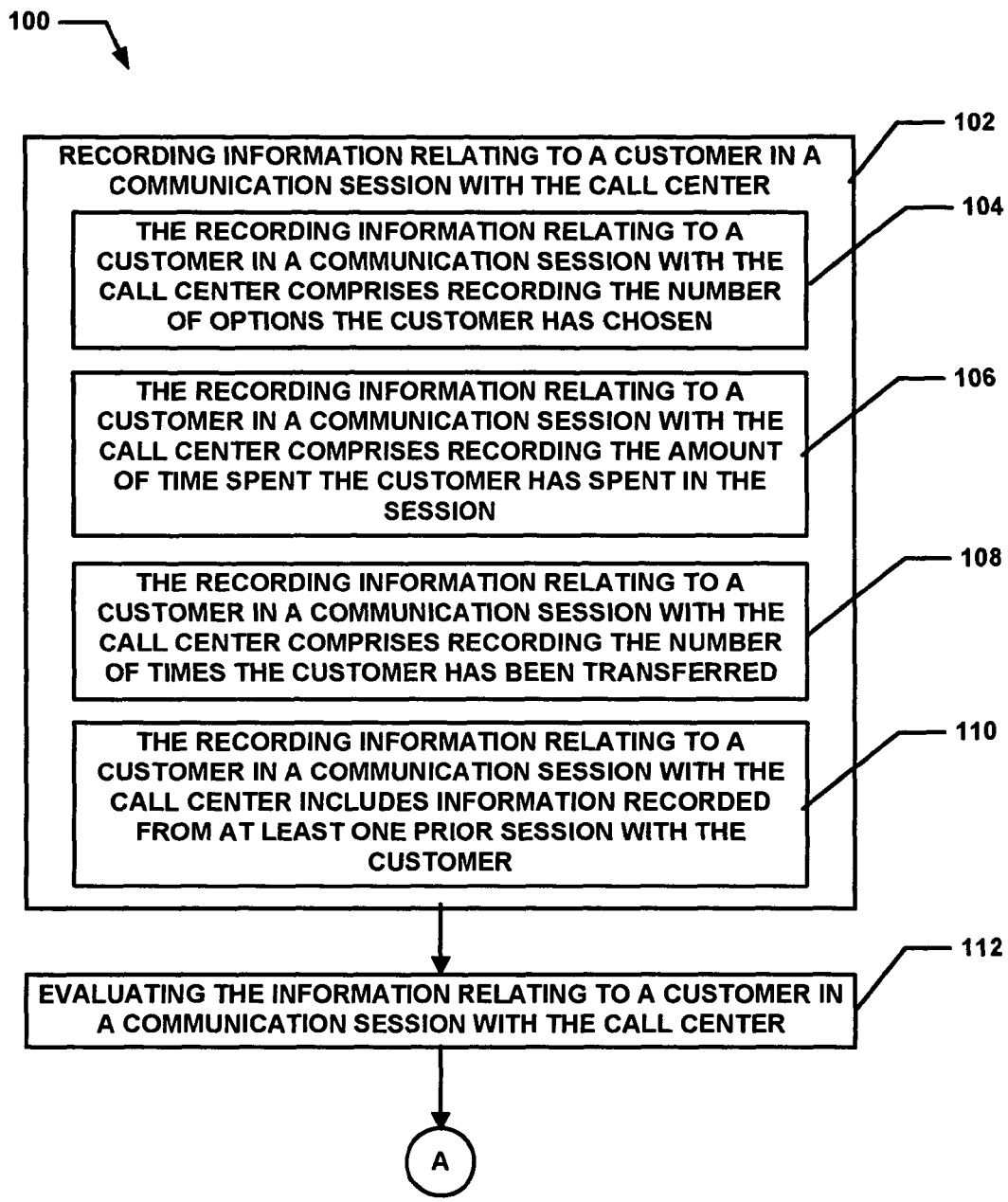
FIGS. 2A and 2B depict a flow diagram of a particular embodiment of a method of determining customer routing in a call center in accordance with embodiments of the invention.
Figure 2B:
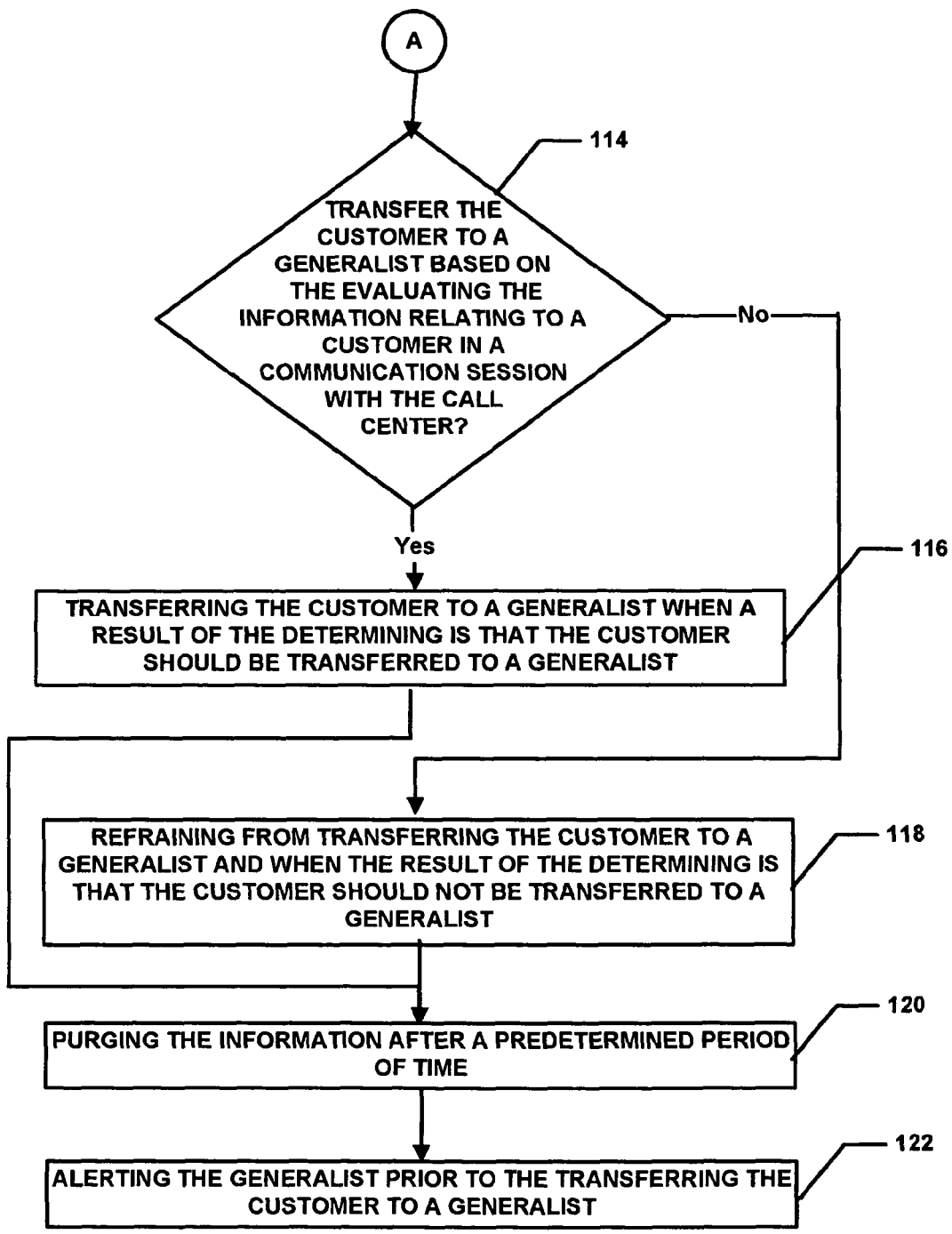

A flow chart of a particular embodiment of the presently disclosed method for determining customer routing in a call center is depicted in FIGS. 2A and 2B. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

The method 100 begins with processing block 102 which discloses recording information relating to a customer in a communication session with the call center. This may include, as shown in processing block 104 recording the number of options said customer has chosen. This may also include, as shown in processing block 106, recording the amount of time the customer has spent in the session. Further, this can include, as recited in processing block 108 recording the number of times the customer has been transferred. Additionally, this can include information recorded from at least one prior session with said customer as recited in processing block 110.

Processing block 112 states evaluating the information relating to a customer in a communication session with the call center. The evaluating may include evaluating the number of options the customer has chosen, the amount of time the customer has spent in the current session, the amount of time the customer has spent in prior sessions, and the like.

Decision block 114 discloses determining whether to transfer said customer to a generalist based on said evaluating the information relating to a customer in a communication session with the call center. When the determination is that the customer should be transferred to a generalist processing continues with processing block 116, otherwise processing continues with processing block 118.

Processing block 116 is executed when the determination is to transfer the customer to a generalist. Processing block 116 discloses transferring the customer to a generalist when a result of the determining is that the customer should be transferred to a generalist. Processing block 118 is executed when the determination is to refrain from transferring the customer to a generalist. Processing block 118 states refraining from transferring the customer to a generalist when the result of the determining is that the customer should not be transferred to a generalist. Processing of the call proceeds in the conventional manner.

Processing block 120 recites purging said information after a predetermined period of time. This sodden periodically such that the determination whether the customer should be transferred to a generalist is based on recent customer experience with the call center.

Processing block 122 discloses alerting the generalist prior to said transferring the customer to a generalist. This is done to make the generalist aware that a customer who has had a history of trouble interacting with the call center will be forwarded to him/her.

Figure 3:
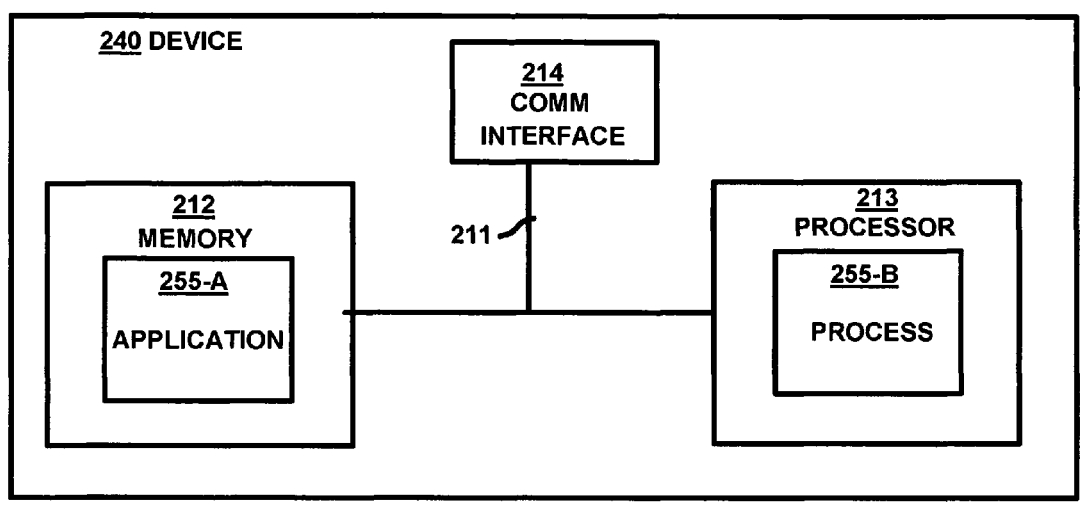
FIG. 3 illustrates an example computer system architecture for a computer system that performs customer routing in a call center in accordance with embodiments of the invention.

FIG. 3 illustrates example architectures of a computer 240. The computer system 240 may be any type of computerized system such as a personal computer, workstation, portable computing device, mainframe, server or the like. In this example, the system includes an interconnection mechanism 211 that couples a memory system 212, a processor 213, and a communications interface 214. The communications interface 214 allows the computer system 240 to communicate with external devices or systems.

The memory system 212 may be any type of computer readable medium that is encoded with an application 255-A that represents software code such as data and/or logic instructions (e.g., stored in the memory or on another computer readable medium such as a disk) that embody the processing functionality of embodiments of the invention for the agent 255 as explained above. The processor 213 can access the memory system 212 via the interconnection mechanism 211 in order to launch, run, execute, interpret or otherwise perform the logic instructions of the applications 255-A for the host in order to produce a corresponding process 255-B. In other words, the process 255-B represents one or more portions of the application 255-A performing within or upon the processor 213 in the computer system.

It is to be understood that embodiments of the invention include the applications (i.e., the un-executed or non-performing logic instructions and/or data) encoded within a computer readable medium such as a floppy disk, hard disk or in an optical medium, or in a memory type system such as in firmware, read only memory (ROM), or, as in this example, as executable code within the memory system 212 (e.g., within random access memory or RAM). It is also to be understood that other embodiments of the invention can provide the applications operating within the processor 213 as the processes. While not shown in this example, those skilled in the art will understand that the computer system may include other processes and/or software and hardware components, such as an operating system, which have been left out of this illustration for ease of description of the invention.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A method of determining customer routing in a call center comprising:
    recording information relating to a customer in a communication session with the call center, wherein said recording information relating to a customer in a communication session with the call center comprises recording the number of options said customer has chosen;
    evaluating the information relating to a customer in a communication session with the call center; and determining whether to transfer said customer to a generalist based on said evaluating the information relating to a customer in a communication session with the call center: and transferring the customer to a generalist when a result of the determining is that the customer should be transferred to a generalist and refraining from transferring the customer to a generalist and when the result of the determining is that the customer should not be transferred to a generalist.

2. The method of claim 1 wherein said recording information relating to a customer in a communication session with the call center comprises recording the amount of time the customer has spent in the session.

3. The method of claim 1 wherein said recording information relating to a customer in a communication session with the call center comprises recording the number of times the customer has been transferred.

4. The method of claim 1 wherein said recording information relating to a customer in a communication session with the call center includes information recorded from at least one prior session with said customer.

5. The method of claim 1 further comprising purging said information after a predetermined period of time.

6. The method of claim 1 further comprising alerting the generalist prior to said transferring the customer to a generalist.

7. A non-transitory computer readable medium having computer readable code thereon for determining customer routing in a call center, the medium comprising:

instructions for recording information relating to a customer in a communication session with the call center, wherein said recording information relating to a customer in a communication session with the call center comprises recording the number of options said customer has chosen;

instructions for evaluating the information relating to a customer in a communication session with the call center; and instructions for determining whether to transfer said customer to a generalist based on said evaluating the information relating to a customer in a communication session with the call center: and instructions for transferring the customer to a generalist when a result of the determining is that the customer should be transferred to a generalist and refraining from transferring the customer to a generalist and when the result of the determining is that the customer should not be transferred to a generalist.

8. The computer readable medium of claim 7 wherein said instructions for recording information relating to a customer in a communication session with the call center comprises instructions for recording the amount of time the customer has spent in the session.

9. The computer readable medium of claim 7 wherein said instructions for recording information relating to a customer in a communication session with the call center comprises instructions for recording the number of times the customer has been transferred.

10. The computer readable medium of claim 7 wherein said instructions for recording information relating to a customer in a communication session with the call center includes information recorded from at least one prior session with said customer.

11. The computer readable medium of claim 7 further comprising instructions for purging said information is purged after a predetermined period of time.

12. The computer readable medium of claim 7 further comprising instructions for alerting the generalist prior to said transferring the customer to a generalist.

13. A computer system comprising:
a memory;
a processor;
a communications interface;
an interconnection mechanism coupling the memory, the processor and the communications interface; and
wherein the memory is encoded with an application for of determining customer routing in a call center that when performed on the processor, provides a process for processing information, the process causing the computer system to be capable of performing the operations of:

recording information relating to a customer in a communication session with the call center, wherein said recording information relating to a customer in a communication session with the call center comprises recording the number of options said customer has chosen;

evaluating the information relating to a customer in a communication session with the call center; and determining whether to transfer said customer to a generalist based on said evaluating the information relating to a customer in a communication session with the call center: and transferring the customer to a generalist when a result of the determining is that the customer should be transferred to a generalist and refraining from transferring the customer to a generalist and when the result of the determining is that the customer should not be transferred to a generalist.

14. The computer system of claim 13 wherein said recording information relating to a customer in a communication session with the call center comprises recording the amount of time the customer has spent in the session.

15. The computer system of claim 13 wherein said recording information relating to a customer in a communication session with the call center comprises recording the number of times the customer has been transferred.

16. The computer system of claim 13 wherein said recording information relating to a customer in a communication session with the call center includes information recorded from at least one prior session with said customer.

17. The computer system of claim 16 wherein said information is purged after a predetermined period of time.

18. The computer system of claim 13 further comprising alerting the generalist prior to said transferring the customer to a generalist.

19. The method of claim 1 wherein said determining includes inferring that a customer has a past history of unsuccessful experiences in self-service and should be forwarded to a generalist.

20. The computer readable medium of claim 7 wherein said determining includes inferring that a customer has a past history of unsuccessful experiences in self-service and should be forwarded to a generalist.

21. The computer system of claim 13 wherein said determining includes inferring that a customer has a past history of unsuccessful experiences in self-service and should be forwarded to a generalist.

* * * * *